United States Patent [19]

Dawson et al.

[11] Patent Number: 4,975,655

[45] Date of Patent: Dec. 4, 1990

[54] METHOD AND APPARATUS FOR UPSHIFTING LIGHT FREQUENCY BY RAPID PLASMA CREATION

[75] Inventors: John M. Dawson, Pacific Palisades; Scott C. Wilks, Santa Monica; Warren B. Mori, Hermosa Beach; Chandrasekhar J. Joshi, Santa Monica; Andrew M. Sessler, Oakland, all of Calif.

[73] Assignee: Regents of the University of California, Oakland, Calif.

[21] Appl. No.: 366,879

[22] Filed: Jun. 14, 1989

[51] Int. Cl.[5] .......................... H01S 3/00; H03F 7/00
[52] U.S. Cl. ...................................... 330/4.3; 350/353
[58] Field of Search .................. 330/4.3; 307/425; 350/353

[56] References Cited

U.S. PATENT DOCUMENTS

| | | | |
|---|---|---|---|
| H554 | 12/1988 | Dawson et al. | 376/107 |
| 3,958,189 | 5/1976 | Sprangle et al. | 330/4.3 |
| 4,235,517 | 11/1980 | Marie | 330/4.3 |
| 4,329,664 | 5/1982 | Javan | 332/7.51 |

OTHER PUBLICATIONS

Clayton et al., "Relatistic Plasma—Wave ... Mixing"; Phys. Res. Lett., vol. 54, #21, 5/27/85, pp. 2343-2346.
Joshi et al., "Ultrahigh Gradient Particle ... Waves"; Nature, vol. 311, 10/84, pp. 525-529.
Chen et al.; "Particle Accelation by Plasma Waves"; Int. Conf. 7th Kiev Plasma Theory ... ; 4/12/87, abstract only.
Katsouleas et al., "Plasma Accelerators"; AIP Conf. Proc., 2nd Workshop; 1/18/85, pp. 63-98; abst. only.
Lange et al.; "Submillimeter Wave Production ... "; N&IS AD-A037613/7, NRL; 3/77, pp. 1-15, abst.
Labita et al.; "High-Frequency ... Plasma"; IEEE Trans. Plasm. Sci.; vol. 16, 1π5, pp. 564-569, 10/88. abst.

*Primary Examiner*—Nelson Moskowitz
*Attorney, Agent, or Firm*—Flehr, Hohbach, Test, Albritton & Herbert

[57] ABSTRACT

Photons of an electromagnetic source wave are frequency-upshifted as a plasma is rapidly created around the path of this propagating source wave. The final frequency can be controlled by adjusting the gas density. A controlled time-varying frequency (chirped) pulse can be produced by using a controlled spatially varying gas density. The plasma must be created in a time which is short compared to the transit time of the light through the plasmas region. For very fast creation over one to at most a few light periods of an overdense plasma, static magnetic fields with short wavelengths are created.

15 Claims, 2 Drawing Sheets

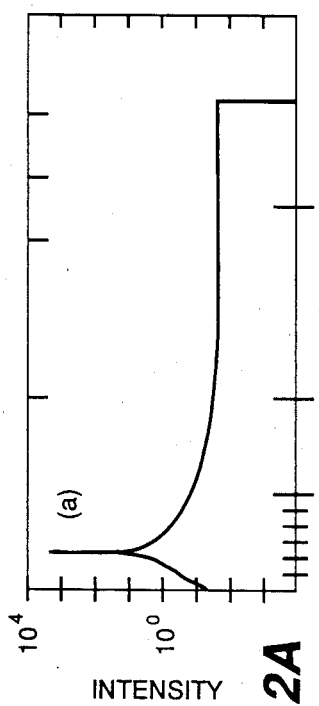
FIG._2A
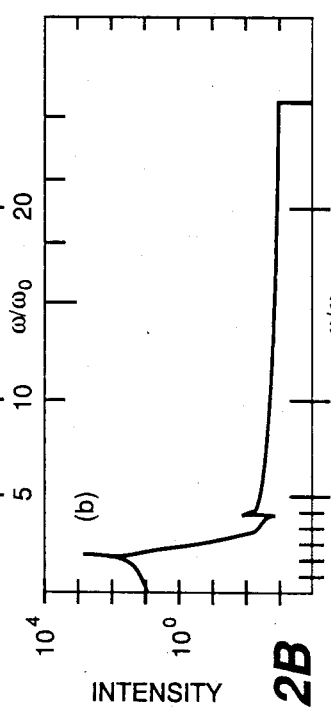
FIG._2B
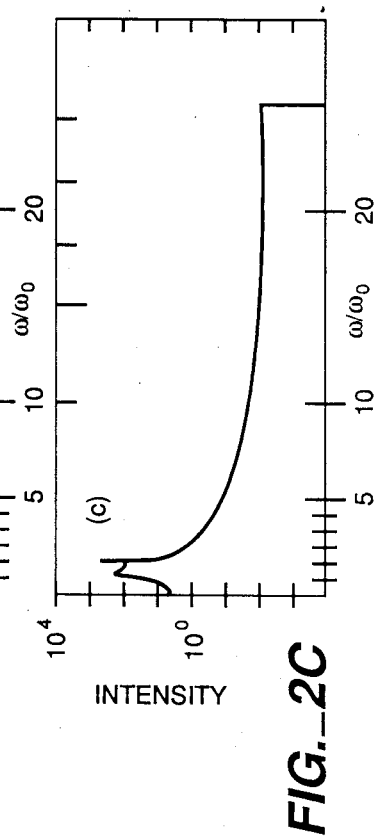
FIG._2C
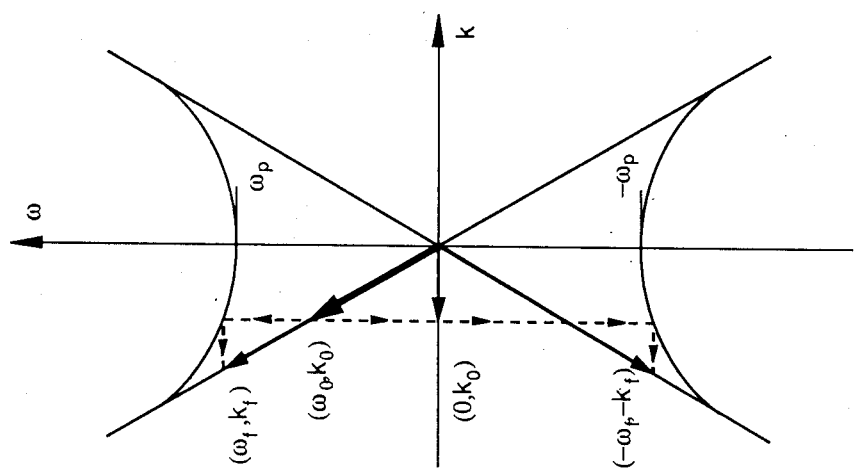
FIG._1

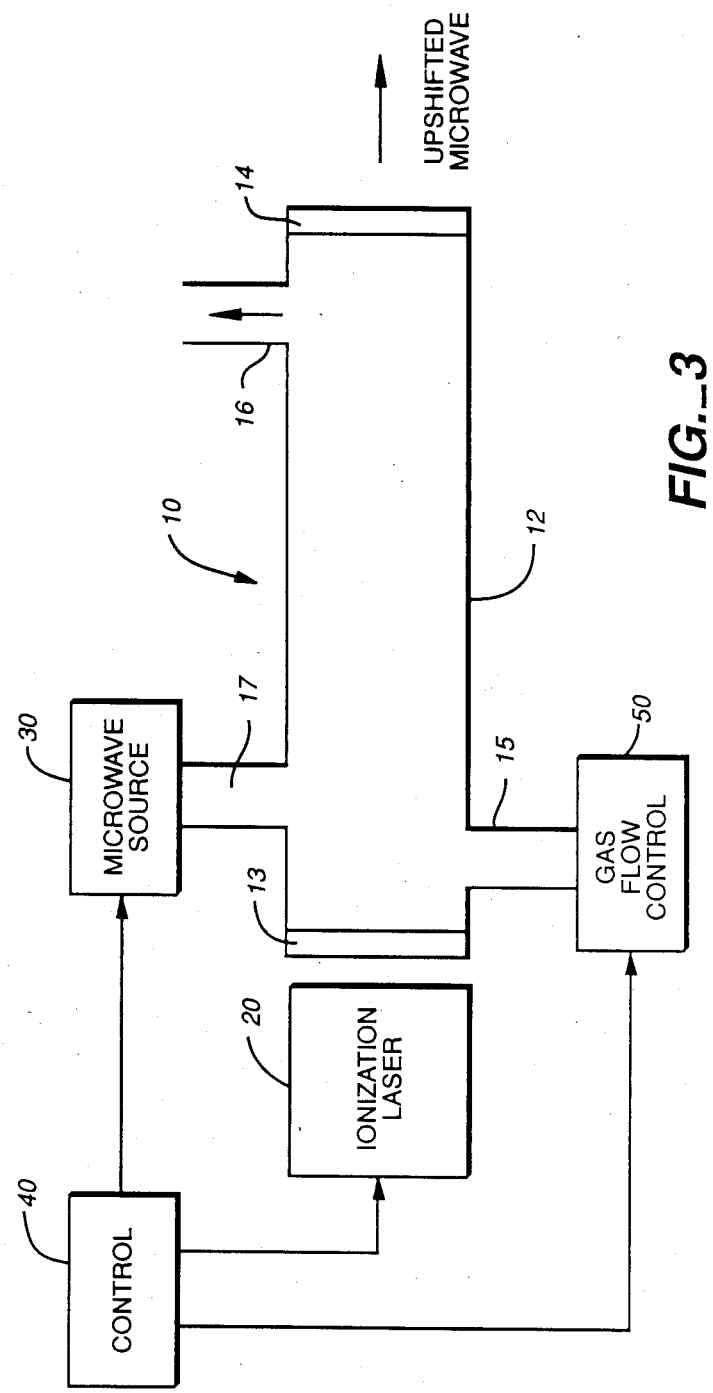
FIG._3

METHOD AND APPARATUS FOR UPSHIFTING LIGHT FREQUENCY BY RAPID PLASMA CREATION

This invention was made with Government support under Grant Contract No. DE-FG 03-87-ER 13752 awarded by the DOE. The Government has certain rights in this invention.

BACKGROUND OF THE INVENTION

This invention relates to a method and apparatus for upshifting the frequency of photons and more particularly to a method and apparatus for upshifting the frequency of a pulse of electromagnetic radiation (EM wave) by propagating it through a gas which is being rapidly ionized to form a plasma. The frequency of the final radiation can be controlled by adjusting the gas density and hence the plasma density. Thus, a tunable source of radiation can be provided which spans a large frequency range, say, from microwaves to optical. Furthermore, by using a non-uniform gas density, chirped EM pulses with time-varying frequency can be created. Such chirped pulses can be created over a wide frequency range. Chirped pulses can be time-compressed to give very short intense radiation pulses.

With recent advances in laser technologies, high-power lasers capable of producing photon pulses of duration 10–1000 femtoseconds (fs) with photon energies of between 2 and 4 eV and total energies of $10^{-3}$ to 1 joule are coming to be available. With such a laser, a small region in space (from 1 mm$^3$ to a few cm$^3$) of a gas can be rapidly ionized within a time period on the order of the pulse duration of an EM wave propagating therethrough. It has been considered of interest to investigate the effects of such a rapidly created plasma on the EM wave propagating therethrough.

SUMMARY OF THE INVENTION

It is an object of the present invention to provide a controlled method of upshifting the frequency of an EM wave.

It is another object of the present invention to provide a method of generating chirped frequency EM pulses over a wide range of frequencies.

It is still another object of the present invention to provide a method of producing intense short wavelength magnetic fields- which persist for times long compared to the light period.

It is a further object of the present invention to provide a device with which aforementioned methods of the present invention can be performed.

It is a still further object of the present invention to investigate effects of a rapidly created plasma on an EM wave which is propagating therethrough.

According to a method of the present invention, an electromagnetic source wave such as a monochromatic H beam (with angular frequency of $\omega_0$) from a microwave source or a laser source such as a $CO_2$ laser is passed through an un-ionized gas while the gas is quickly ionized to generate a plasma within a short time period on the order of the transit time of the EM wave through the gas. For large frequency shifts equal to or greater than the initial frequency, the density of the generated plasma must exceed a certain critical value. If $\omega_0$ represents the angular frequency of the source wave, the critical value is $m\omega_0^2/4\pi e^2$ where m and e are respectively the electronic mass and charge. Calculations by computer simulation show that the source wave is thereby frequency-upshifted. For lower plasma densities, smaller but still useful upshifts occur. The final frequency $\omega_f \approx \omega_0 + \omega_p^2/2\omega_0$, where $\omega_p$ is the plasma frequency, can be controlled by adjusting the gas density.

BRIEF DESCRIPTION OF THE DRAWINGS

The accompanying drawings which are incorporated in and form a part of the specification, illustrate an embodiment of the present invention and, together with the specification, serve to explain the principles of the invention. In the drawings:

FIG. 1 is a graph of dispersion relation for electromagnetic waves in an instantaneously created plasma, FIGS. 2A through 2C are a set of graphs which shows the effects of ionization time on the power spectrum of radiation with upshifted frequency according to the present invention, and FIG. 3 is a schematic sectional view of a photon frequency upshifter embodying the present invention with some components shown as a block diagram.

DETAILED DESCRIPTION OF THE INVENTION

The principle, upon which the present invention is based, is described first by way of an example wherein a monochromatic electromagnetic source wave such as a microwave or a $CO_2$ laser beam propagates through a gas which is ionized rapidly to form a plasma. Such an example has been described by some of the present inventors in the Physical Review Letters, Vol. 61, Page 337 (July 18, 1988), which is incorporated hereinto by reference.

An EM pulse of a monochromatic source wave, propagating along a positive x-direction within an un-ionized gas with an index of refraction nearly equal to 1 for this EM frequency, may be approximately represented as shown below as plane-polarized-wave solutions to Maxwell's equations:

$$E = E_0 \cos(k_0 x - \omega_0 t) e_y \qquad \text{Eq. (1)}$$

$$B = B_0 \cos(k_0 x - \omega_0 t) e_z \qquad \text{Eq. (2)}$$

where $E_0 = B_0$ and $\omega_0 = k_0 c = 2\pi/T$ is the angular frequency of the source laser, c being the speed of light, and $e_y$ and $e_z$ are respectively unit vectors along the y-axis and the z-axis. It will be assumed that the source wave for this pulse is sufficiently low in power such that it does not ionize the gas.

Let us assume that a plasma is rapidly created around a portion of this EM pulse at time $t = 0$. By the rapid creation of a plasma, it will be herein understood to mean that the plasma is created within a time interval which is short compared to the period T of the source laser. At time $t = 0$, the fields (inside the plasma which is being created) have the form of Eqs. (1) and (2) evaluated at $t = 0$. Subsequently, the fields still oscillate with the same spatial periodicity but their angular frequency evolves in time to a final value (to be denoted by $\omega_f$). This is because, unlike the boundary value problem of an EM wave propagating across a vacuum-plasma boundary, the problem to be considered here is an initial-value problem. An EM wave in a boundary value problem, propagated into a dense plasma from the vacuum side of a vacuum-plasma boundary, sees a discontinuity in space at the vacuum-plasma interface. But the medium through which the wave propagates is timeindependent and this keeps the angular frequency of the pulse fixed. If the plasma is over the critical density, the EM pulse penetrates only a skin depth and is reflected back into the vacuum. For the case of a rapid creation of a plasma, by contrast, it is a discontinuity in time that is being created and this means that the pulse frequency can change but the wavelength (and, hence, the wave number k) must remain the same before and after the ionization takes place. Thus, the final value $\omega_f$ to which the angular frequency of the pulse will grow is given by $$\omega_f^2 = k_0^2 c^2 + \omega_p^2 \qquad \text{Eq. (3)}$$

according to the plasma dispersion relation as shown in FIG. 1 where $\omega_p$ is the plasma frequency of the created plasma. A large frequency upshift is therefore possible if the plasma density is greater than a critical density $n_c$ defined by $n_c = m\omega_0^2/4\pi e^2$ where m and e are respectively the electronic mass and charge. Such plasmas are hereinafter sometimes referred to as overdense plasmas. From these considerations, it is clear that the final frequency can be controlled by controlling the gas density. Any frequency can be obtained from the source frequency to a maximum frequency determined by the maximum plasma frequency that can be created. This range should cover frequencies from microwaves to the optical, and possibly extend into the ultraviolet. It is also clear that a frequency which is time-varying (chirped) can be created by using a non-uniform gas density and hence creating a non-uniform plasma density and a range of upshifted frequencies.

When the plasma is suddenly created (at t=0) as described above, the electrons which are thereby suddenly set free are accelerated and radiate in all directions such that the EM pulse which was originally propagating only in the positive x-direction is broken into two components propagating respectively into the positive and negative x-directions. In addition, some electrons follow the electric field of the initial wave and immediately create a transverse current in the plasma, allowing for a static (zero-frequency) B field.

The plasma dispersion relation allows solutions corresponding to waves propagating both in the positive and negative x-directions (as indicated in FIG. 1). Introduction of the plasma adds an additional degree of freedom related to the motion of the electrons and there arises another solution for the B field for which $\omega = 0$ and $k = k_0$ (as also indicated in FIG. 1). This stationary, sinusoidally varying magnetic field remains in the plasma even after the upshifted light (to $\omega_f$) has been radiated out of the plasma. In view of the dispersion relation for electromagnetic waves in a rapidly created plasma as described above, the fields at times $t > 0$, when the plasma is present, are given by $$E_{t>0} = \{E_+ \cos(k_0 x + \omega_f t) + E_- \cos(k_0 x + \omega_f t)\} e_y \qquad \text{Eq. (4)}$$

$$B_{t>0} = (1 - \omega_p^2/\omega_f^2)^{\frac{1}{2}} \{E_+ \cos(k_0 x - \omega_f t) - E_- \cos(k_0 x + \omega_f t)\} e_z + B_s \cos(k_0 x) e_z \qquad \text{Eq. (5)}$$

The velocity of the plasma electrons is given by $$v_{t>0} = (-ie/m\omega_f)\{E_+ \cos(k_0 x - \omega_f t) - E_- \cos(k_0 x + \omega_f t)\} e_y + v_s \cos(k_0 x) e_y \qquad \text{Eq. (6)}$$

where, by Amperes law and with the assumption that the plasma temperature is initially negligible, $$ik_0 B_s = 4\pi n_0 e v_s / c \qquad \text{Eq. (7)}$$

The present invention is further described below by way of results obtained by a series of computer simulations which are based on the equations derived above and performed by using the plasma code WAVE described by R. L. Morse and C. W. Neilson (Phys. Fluids 14, 830 (1971)). In the calculation, it was assumed that the laser-plasma interaction of the type described above occurs within a region of length L inside the plasma along the path of propagation of the source wave. The region is assumed to have well-defined vacuum-plasma boundaries at $x = \pm L/2$. L is taken to be large enough to include a large number of wavelengths such that edge effects can be neglected. If the initial fields of Eqs. (1) and (2) are matched with the solutions of the wave equation with the plasma present, one obtains $$E_{\pm} = (E_0/2)(1 \pm \omega_0/\omega_f) \qquad \text{Eq. (8)}$$

Additionally, one finds from Eqs. (4)–(7) that $$B_s \cos(k_0 x) = \omega_p^2 E_0 \cos(k_0 x)/(\omega_p^2 + \omega_0^2) \qquad \text{Eq. (9)}$$

As the plasma density is increased such that $\omega_p$ is much greater than $\omega_0$, the amplitude of the B field approaches the value of the original field, which can be on the order of a megagauss at the focal spot of a $CO_2$ laser with an intensity of $2.5 \times 10^{14}$ W/cm$^2$. For this laser, the magnetic field will vary sinusoidally in space with a wavelength of 10 $\mu$m. This field may have applications as an undulator for free electron lasers and synchrotron light sources. Amplitude tapering of this undulator B field can be achieved by variation of the neutral gas pressure.

FIG. 2 shows the frequency and amplitude of the output radiation calculated by computer simulation as mentioned above for different speeds of plasma creation. The final plasma density in all cases is $2n_c$ and L is 20 times the wavelength of the source wave. The first graph (a) shows the case of instantaneous turn-on whereby the overdense plasma is created instantaneously. The second and third graphs (b) and (c) show the cases where the plasma is created over a time interval of one period and 10 periods, respectively. These graphs of FIG. 2 indicate that an increase of the ionization time from zero to one cycle to ten cycles of the incident wave still results in upshifted light. For long turn on times, however, much of the light leaves the plasma before the full plasma density is reached. As a result, a spread in frequency shifts results with the first light to leave being unshifted and light leaving after full ionization being fully upshifted. This provides a second method of controlled continuum frequency generation. This also indicates that efficient upshifting occurs if the ionization takes in a time short compared to the transit time of the pulse through the plasma region.

Another interesting effect that has been noted in the simulations is that if the ionization time is much longer (say, by an order of magnitude or two) than the period T of the wave, the transverse oscillations are sufficiently out of phase so that instead of a coherent radiator, strong transverse heating of the plasma results. This heating differs from other laser heating methods in that it occurs in the absence of collisions or parametric instabilities. Physically, what has happened is that because the ionization takes place over a number of cycles of the source wave, electrons are born at different phases of the electric field associated with the wave. Therefore, some of the energy of the electric field of the source wave, which would have gone into the coherent transverse current to sustain the magnetic field in the case of instantaneous ionization, ends up as random thermal motion of the electrons for long turnon times.

FIG. 3 shows a wave guide photon frequency upshifter 10 with which an EM source wave may be frequency-upshifted by a method of the present invention. As schematically illustrated, the upshifter 10 is comprised of a wave guide 12, an ionization laser 20, a microwave source 30 and a control unit 40. The wave guide 12 is generally tubular but its cross-sectional shape does not limit the scope of the present invention. The wave guide 12 is provided at one end with a front window 13 through which an ionization laser beam from the ionization laser 20 can be introduced into its interior to quickly ionize the gas inside. At the other end of the wave guide 12 is a back window 14 through which the ionization laser beam and the frequency-upshifted EM wave can leave the wave guide 12. The wave guide 12 is also provided between these windows 13 and 14 a gas inlet 15 and a microwave inlet 17 near the front window 13 and a gas outlet 16 near the back window 14 such that a gas to be ionized by the laser beam entering through the front window 13 can flow longitudinally along the tubular wave guide 12 from the gas inlet 15 to the gas outlet 16. The source EM wave from the source 30 to be frequency-upshifted is introduced into the wave guide 12 through the microwave inlet 17 and propagates longitudinally through the interior of the wave guide 12. Means for controlling the flow rate of the gas through the wave guide 12 are schematically shown at 50. The technology of controlling the gas density inside such a wave guide and the technology of establishing a desired gradient of gas density in such a wave guide are well established. Means therefor are therefore not described in detail. The control unit 40, which is shown also only schematically, is programmed to frequency-upshift the source EM wave from the source 30 by any of the methods embodying the present invention described above.

The present invention has been described above by way of only a small number of computer simulation calculations but it is not intended to limit the scope of the invention. Nor is the type of source of EM waves disclosed above intended to limit the scope of the invention. As for the creation of overdense plasmas within the meaning of the present invention, current technology can be seen to be sufficient for creating plasmas with twice the critical density $n_c$ for $CO_2$ in tens of femtoseconds if one considers that to create a xenon plasma of density $2 \times 10^{19}$ cm$^{-3}$ in a volume of dimensions $100 \times 50 \times 50$ $\mu m^3$ with a 0.3-$\mu m$ laser requires only about $10^{-2}$ mJ of energy in the laser pulse. Here, multiphoton ionization is assumed to be the mechanism responsible for plasma creation and complete ionization is assumed to take place only over the length of the pulse (i.e., no cascading). Currently, XeCl excimer lasers are capable of 3.5 mJ in 100 fs (about three oscillations of 10-$\mu m$ radiation) which, when focused into a 50-$\mu m^2$ area, gives an intensity of $10^{15}$ W/cm$^2$. Such a pulse both exceeds the multiphoton ionization threshold ($\sim 10^{14}$ W/cm$^2$) and contains enough energy to create a sizable region of plasma adequate for production of a significant amount of upshifted radiation. One possible method would be to direct a single ionizing laser perpendicular to the source wave. In this case, an ionization front propagates across the source wave. Preliminary two-dimensional simulations show that the only modification to analytical results obtained by the present inventors is that the wave fronts become curved. The present inventors' studies also show that with two or more time-tailored laser pulses, it is possible to approximately instantaneously ionize a finite region of gas without violation of causality.

What is claimed is:

1. A method of frequency-upshifting photons comprising the steps of
    causing an electromagnetic source wave to propagate through an un-ionized gas along a path, and
    ionizing said gas to create in an ionization region on said path a plasma within a time period which is less than the transit time of said source wave through said ionization region so that said source wave is frequency-upshifted.

2. The method of claim 1 wherein said source wave is monochromatic, having angular frequency $\omega_0$, said method further comprising the step of controlling the density of said gas and hence that of said plasma to thereby control the upshifted output frequency of said source wave.

3. The method of claim 2 further comprising the step of creating a spatial density variation in said gas and causing said monochromatic source wave to propagate through said gas with said spatial density variation, thereby producing a chirped pulse.

4. The method of claim 2 wherein both said gas and said monochromatic wave are confined inside a wave guide.

5. The method of claim 1 wherein said source wave is not powerful enough to ionize said un-ionized gas.

6. The method of claim 2 wherein said plasma is created by a laser pulse.

7. The method of claim 6 wherein said plasma is created to a density which is greater than the critical density $m\omega_0^2/4\pi e^2$ regarding said pulse where m and e are respectively the electronic mass and charge.

8. The method of claim 1 wherein said plasma is created by propagating an ionizing laser wave perpendicularly to said source wave.

9. An apparatus for frequency-upshifting photons comprising
    a tubular wave guide having a first end and a second end,
    a first window at said first end capable of allowing an ionization laser pulse to pass through,
    a second window at said second end capable of allowing said laser pulse and a frequency-upshifted EM wave to pass through,
    a gas inlet and a gas outlet formed on said wave guide such that a gas can be made to flow longitudinally through said wave guide from said gas inlet to said gas outlet, and
    a control means capable of causing an electromagnetic source wave to propagate through an un-ionized gas inside said wave guide and ionizing said gas to create a plasma in an ionization region inside said wave guide within a time period which is less than the transit time of said source wave through said ionization region so that said source wave is frequency-upshifted.

10. The apparatus of claim 9 wherein said source wave is monochromatic, having angular frequency $\omega_0$, said control means being further capable of controlling the density of said gas and hence that of said plasma to thereby control the upshifted output frequency of said source wave.

11. The apparatus of claim 10 wherein said control means is further capable of causing a spacial density variation created in said gas inside said wave guide and causing said monochromatic source wave to propagate through said gas with said spatial density variation, thereby producing a chirped pulse.

12. The apparatus of claim 9 wherein said source wave is not powerful enough to ionize said un-ionized gas.

13. The apparatus of claim 9 further comprising an ionization laser controlled by said control means to propagate an ionization pulse through said first window into said wave guide.

14. A method of interacting an electromagnetic wave with an ionizing gas, said method comprising the steps of causing an electromagnetic source wave to propagate through an un-ionized gas along a path, and ionizing said gas to create in an ionization region on said path a plasma within a time period which is on the order of the period of said source wave through said ionization region so as to produce magnetic fields on the order of megagauss strength with the wavelength of said source wave that persist for times long compared to the period of said source wave.

15. A method of producing a transversely heated plasma comprising the steps of causing an electromagnetic source wave to propagate through an un-ionized gas along a path, and ionizing said gas to create in an ionization region on said path a plasma within a time period which is one or two orders of magnitude greater than the period of said source wave through said ionization region.

* * * * *